United States Patent [19]

Narayanan et al.

[11] Patent Number: 5,037,453
[45] Date of Patent: Aug. 6, 1991

[54] ABRASIVE ARTICLE

[75] Inventors: Kesh S. Narayanan, Holden; Muni S. Ramakrishnan, Northborough, both of Mass.

[73] Assignee: Norton Company, Worcester, Mass.

[21] Appl. No.: 406,487

[22] Filed: Sep. 13, 1989

[51] Int. Cl.$^5$ ............................................... C09C 1/68
[52] U.S. Cl. ........................................ 51/307; 51/298; 51/308; 51/309
[58] Field of Search ................ 51/298, 307, 308, 309

[56] References Cited

U.S. PATENT DOCUMENTS

| | | | |
|---|---|---|---|
| 1,524,134 | 0/1925 | Hutchins | 51/296 |
| 1,830,757 | 11/1931 | Hartman | 51/296 |
| 1,956,905 | 5/1934 | Merriam | 51/296 |
| 1,986,850 | 1/1935 | Pohl | 51/296 |
| 2,806,772 | 9/1957 | Robie | 51/296 |
| 2,986,455 | 5/1961 | Sandmeyer | 51/296 |
| 3,329,488 | 7/1967 | Cofran | 51/296 |
| 3,661,544 | 5/1972 | Whitaker | 51/295 |
| 4,226,602 | 10/1980 | Fukuda | 51/296 |
| 4,314,827 | 2/1982 | Leitheiser et al. | 51/298 |
| 4,623,364 | 11/1986 | Cottringer et al. | 51/309 |
| 4,741,743 | 5/1988 | Narayanan et al. | 51/309 |
| 4,744,802 | 5/1988 | Schwabel | 51/309 |
| 4,800,685 | 1/1989 | Haynes, Jr. | 51/298 |

*Primary Examiner*—William R. Dixon, Jr.
*Assistant Examiner*—Willie Thompson
*Attorney, Agent, or Firm*—David Bennett

[57] ABSTRACT

Abrasive article using sintered sol-gel abrasive particles mixed with other particles having greater friability, and carried in a bond.

13 Claims, No Drawings

ABRASIVE ARTICLE

BACKGROUND OF THE INVENTION

It is well known that the nature and content of the abrasive grains in a bonded abrasive article have significant influence on the grinding performance of such articles. The term "nature", as herein used, refers to chemical composition, morphology, shape, and size for both the individual abrasive grain and any microcystalline components thereof. For example, each grit of the sintered seeded sol gel aluminous abrasive grain of Cottringer, et al, and described in U.S. Pat. 4,623,364, is composed of an assemblage of alpha alumina crystallites each no larger than 0.4 microns. Vitreous bonded articles prepared from such abrasive grits outperform identical articles prepared from conventional fused alumina abrasive by 600% or more in wheel life and in the ratio of metal removed to wheel wear, while consuming less power and removing metal at a higher rate. In organic bonded abrasive articles, sintered sol gel abrasive, while superior to normal fused alumina abrasives, has hitherto not shown the dramatic improvement seen in vitreous bonded articles. It is an object of the invention to produce organic bonded abrasive articles whose abrasive grits are wholly or in part sintered sol gel alumina and which show the dramatic improvements in performance now obtained with vitreous bonded abrasive articles containing sintered sol gel alumina.

At high grinding pressures, organic bonded abrasive articles wear too rapidly to take advantage of the superiority of the individual sol gel aluminous grits and at low force levels not enough pressure is exerted on individual grains to microfracture for self-sharpening.

It is well known in the art that dilution of the abrasive grit portion of bonded abrasive articles with softer more friable particles will increase the wear rate of such articles and also increase the cutting rate. Hartmann, in U.S. Pat. No. 1,830,757, teaches a self-sharpening wheel in which friable particles of calcined clay, porous alumina, magnesia or glass, all softer than the abrasive grits, are incorporated to break out during grinding leaving an open, free-cutting grinding face. Similarly, Robie, in U.S. Pat. No. 2,806,772 teaches the use of clay balloons, porous clay pellets, and other friable particles to provide pore support and increase freedom of cut. Sandmeyer, in U.S. Pat. No. 2,986,850, recognized the unique ability of hollow alumina spheres to serve as both abrasive grit and pore spacer in bonded abrasive articles. Grinding wheels of 100% alumina bubbles, made according to the Sandmeyer patent, wear very rapidly and are only suitable for grinding soft materials such as cork, rubber, fiber board, etc. Fukada, in U.S. Pat. No. 4,226,602, incorporates pore-forming blowing agents with or without alumina bubbles in a continuously-formed resin bonded abrasive article of improved cutting ability. Zimmer, in South African Disclosure 82/0339, describes resin bonded abrasive articles of less than 14% interconnected porosity containing silane-treated porous support material, including alumina bubbles, and multicellular glass modules. The function of the porous materials in this instance was to prevent slumping during cure and reduce infiltration of water during wet grinding.

Other methods of introducing pores into organic bonded abrasive articles are well known, as exemplified by Pohl, in U.S. Pat. No. 1,986,850 in which uniformly distributed hollow spaces are produced in abrasive bodies by gas evolution and use of soluble or sublimable spheres.

In the present invention, a substitution of bubble alumina spheres or softer, more friable, particles for a portion of the sintered sol gel alumina grains not only increases the cutting rate, but decreases the wheel wear for unexpectedly high G-ratios (volume of metal removed per volume of wheel wear).

This is in contradiction to the teachings of prior art, where one would expect to obtain (with such substitutions) a faster cutting but more rapidly wearing abrasive article.

The difficulties described above encountered with abrasive articles using sintered sol gel alumina abrasive particles have been obviated in a novel manner by the present invention.

It is, therefore, an outstanding object of the present invention to provide an abrasive article in which sintered sol gel alumina abrasive particles are resin bonded and yet provide increased cutting rates with decreased wheel wear.

Another object of the invention is to provide an abrasive article offering the advantages of sintered sol gel alumina abrasive particles without unacceptable wheel wear.

A further object of the invention is to provide an abrasive article combining excellent cutting rate and acceptable wheel wear characteristics with relatively inexpensive material cost.

Another objective of the invention is to provide an abrasive article which, for a given grinding rate, uses less power and is less likely to damage a workpiece metallurgically.

With these and other objectives in view, as will be apparent to those skilled in the art, the invention resides in the combination of parts set forth in the specification and covered by the claims appended hereto.

SUMMARY OF THE INVENTION

In general, the invention relates to an abrasive article containing sintered sol gel alumina abrasive particles such as those described by Leitheiser, Schwabel, and Cottringer, mixed with other particles having greater friability than the alumina abrasive particles and bonded in resin or vitrified containing filler materials.

More specifically, the other particles are present in the amount approximately equal to 50% of the total particles and each sintered sol gel alumina abrasive particle is made up of a multitude of sintered alpha alumina crystals which are of a size in the order of 0.4 microns or finer.

DESCRIPTION OF THE PREFERRED EMBODIMENT

The invention organic or vitrified bonded abrasive bodies make use of sintered sol gel alumina abrasive grits together with bubble alumina or other friable granules to achieve the fast cutting action well known and expected from such combinations together with an unexpectedly high G-ratio and wheel life. This unexpected combination of properties is of great economic importance since lesser quantities of expensive sol gel alumina abrasive are required to produce high performance grinding wheels and other bonded abrasive bodies.

The preferred abrasive portion of the invention bodies is selected from seeded or unseeded sol gel alumina grits and may be combined with other abrasives, such as diamond, CBN, sintered or fused alumina, silicon carbide, zirconia, or sintered or fused alumina-zirconia. These abrasives may be surface treated with hydrophobic compounds, such as silanes, where grinding with water-based coolants is anticipated. Such treatments are well-known in the art. All of the abrasives used in the three examples which follow were treated with 0.2 cc of silane A1102 TM per pound of abrasive and dried at 150° C. for 24 hours. Silane A1102 TM was obtained from Union Carbide Corporation, Danbury, Conn.

The preferred friable particles in the invention bodies is bubble alumina or other hollow silicate particles but may also consist of, or include, solid or porous friable particles such as calcined clay, pumice, glass, feldspar, nepheline syenite and the like, as well as solid and hollow spheres made from organic polymer.

A conventional organic resinoid or vitrified binder may be mixed with a variety of fillers to bind the abrasive grains and friable grains together. Preferably, the organic binder is a thermosetting phenolic resin with or without modifiers such as rubber or epoxy.

Examples of resins which may be employed include phenoxy, phenol-furfural, analine-formaldehyde, urea-formaldehyde, epoxy, cresol-aldehyde, urethane, polyester, resorcinol-aldehyde, urea-aldehyde, melamine-formaldehyde, and mixtures thereof.

As is well known, there are various inorganic and organic fillers and mixtures of fillers which may be put in organic bonded abrasive bodies for improving strength, reducing cost, and most importantly for improving grinding performance. The fillers are usually considered to be part of the bond and are in a finely divided state, much smaller than the primary grinding abrasive grits.

Suitable conventional and well known fillers are cryolite, fluorspar, iron pyrites, zinc sulfide, magnesia, silicon carbide, sodium chloride, potassium fluoborate, calcium oxide, potassium sulfate, copolymer or vinylidene chloride and vinyl chloride (Saran B), polyvinylidene chloride, polyvinyl chloride, other fibers, sulfides, chlorides, sulfates, fluorides and mixtures thereof.

EXAMPLE 1

A series of nine cold-pressed resin bonded wheel compositions were prepared as follows for grinding tests. The batch compositions are given in Table 1.

TABLE 1

| Wheel | BATCH WEIGHTS IN POUNDS | | | | | | |
|---|---|---|---|---|---|---|---|
| | A | B | C | D | E | G | J |
| Wheel grade | R | R | R | R | R | T | T |
| Density | 2.54 | 2.53 | 2.38 | 2.04 | 2.17 | 2.11 | 2.24 |
| 46 grit size seeded sol-gel alumina abrasive | 0 | 5.96 | 6.33 | 7.39 | 11.57 | 7.14 | 11.21 |
| 46 grit size semifriable fused alumina abrasive | 20.11 | 14.23 | 10.58 | 0 | 0 | 0 | 0 |
| 46 grit size Syenite 333 TM | 0 | 0 | 2.99 | 11.65 | 7.83 | 11.27 | 7.58 |
| Varcum 29717 TM powdered phenolic resin | 2.30 | 2.32 | 2.46 | 2.87 | 2.70 | 3.79 | 3.57 |
| Varcum 2930 TM liquid phenolic resin | 0.37 | 0.37 | 0.40 | 0.46 | 0.44 | 0 | 0 |
| Cryolite −200 mesh | 2.10 | 2.11 | 2.24 | 2.62 | 2.46 | 2.46 | 2.32 |
| Carbon black | 0.05 | 0.05 | 0.05 | 0.06 | 0.05 | 0 | 0 |
| Chloroflo 40 TM | 50 cc | 50 cc | 50 cc | 50 cc | 50 cc | 40 cc | 0 |
| Furfural | | | | | | 165 cc | 156 cc |
| Quicklime | | | | | | 0.54 | 0.51 |

TABLE 1

| Wheel | BATCH WEIGHTS IN POUNDS | | | | |
|---|---|---|---|---|---|
| | K | L | M | N | P |
| Wheel grade | T | T | ZZ | ZZ | ZZ |
| Density | 1.82 | 2.67 | 2.87 | 2.87 | 2.80 |
| 46 grit size seeded sol-gel alumina abrasive | 13.77 | 9.40 | 0 | 9.70 | 19.58 |
| 46 grit size semifriable fused alumina abrasive | 0 | 9.62 | 15.74 | 9.93 | 0 |
| Bubble alumina 0.5–1.0 mm dia. | 3.60 | 0 | 0 | 0 | 0 |
| Varcum 29717 TM powdered phenolic resin | 4.25 | 2.98 | 2.45 | 3.09 | 3.12 |
| Varcum 2930 TM liquid phenolic resin | 0 | 0 | 0 | 0 | 0 |
| Cryolite −200 mesh | 2.76 | 0 | 1.59 | 2.00 | 2.02 |
| Furfural | 191 cc | 150 cc | 107 cc | 135 cc | 136 cc |
| Quicklime | 0.61 | 0.43 | 0.35 | 0.44 | 0.45 |
| Iron pyrites | | 2.33 | | | |
| Potassium sulfate | | 0.43 | | | |

57 Alumdum TM fused semifriable abrasive is a product of the Norton Company, Worcester, Massachusetts.
Syenite 333 TM is a mined mineral, nepheline syenite, available from Indusmin Division, Havelock, Ontario, Canada.
Varcum 2930 TM Reichold Chemical Company, Niagra Falls, New York.
Varcum 29717 TM is a rubber modified powdered phenolic resin available from Varcum Division, Reichold Chemical Company, Niagra Falls, New York.
Chloroflo 40 TM is a liquid chlorinated paraffin obtainable from Dover Chemical Company, Dover, Ohio.

Standard mixing procedures for the preparation of resin bonded abrasive mixes were followed, i.e., the abrasive and any friable abrasive diluents were placed in a rotating mixing pan and wet with liquid resin or furfural before the introduction of the powdered resin and fillers. After five minutes of mixing the batch was ready to press into wheels. Wheels were pressed to 5⅛ inch diameter (130.2 mm) with 1 inch (25.4 mm) hole and 0.563 inch (14.3 mm) in thickness using the proper weight of mix to provide the correct final density. In each case this density was calculated to yield 52 volume percent of abrasive or abrasive plus diluent. Wheels of grade ZZ were hot pressed to achieve near zero porosity, all others were cold pressed. After pressing the wheels were placed on alumina bats and cured in a convection-type electric oven at 175° C. for 15 hours. The cured wheels were then dressed to 5 inches (127 mm) in diameter and hole was reamed to 1¼ inches (31.8 mm) in diameter.

The prepared wheels were then tested in a slot-grinding mode on 4340 steel blocks, hardened to Rc48, 16⅛ inches (409.6 mm) in length. For this test the face of each wheel was reduced to ¼ inch in width (6.35 mm) and slots were ground lengthwise into the 4340 steel block using three separate infeeds: 0.5 mils, 1.0 mils and 2.0 mils (0.0126 mm, 0.0254 mm and 0.1016 mm). Total depth of infeed for each test was 100 miles (2.54 mm).

The test was conducted on a surface grinder with table speed set at 50 feet per minute (15.24 meters per minute) and wheel speed set at 6500 surface feet per minute (33.02 meters per second). The test was conducted wet using E55 TM coolant from the White & Bagley Co., Worcester, Mass., diluted with 40 parts of city water. Careful measurements were made of wheel wear and metal removal as well as the power consumed in each slot grind.

The results of the grinding test are given in Table 2 as follows:

TABLE 2

SLOT GRINDING TEST RESULTS

| Abrasive/ Diluent | Wheel Marking | Feed (mils) | G Ratio (S/W) | Relative G Ratio | Relative (start/finish) | |
|---|---|---|---|---|---|---|
| 100% 57A TM fused alumina | A (R grade) | 0.5 | 13.13 | 100 | 100 | 100 |
| | | 1.0 | 5.61 | 100 | 100 | 100 |
| | | 2.0 | 2.51 | 100 | 100 | 100 |
| 70% 57A TM 30% sol-gel alumina | B (R grade) | 0.5 | 33.21 | 253 | 92 | 100 |
| | | 1.0 | 10.94 | 195 | 96 | 118 |
| | | 2.0 | 5.47 | 218 | 100 | 96 |
| 50% 57A TM 30% sol-gel 20% Syenite | C (R grade) | 0.5 | 50.44 | 384 | 71 | 83 |
| | | 1.0 | 13.61 | 243 | 83 | 123 |
| | | 2.0 | 4.65 | 185 | 96 | 92 |
| 30% sol-gel alumina 70& Syenite | D (R grade) | 0.5 | 25.53 | 194 | 46 | 88 |
| | | 1.0 | 10.96 | 195 | 70 | 100 |
| | | 2.0 | 3.38 | 135 | 104 | 81 |
| 50% sol-gel alumina 50% Syenite | E (R grade) | 0.5 | 68.43 | 521 | 50 | 94 |
| | | 1.0 | 19.79 | 353 | 74 | 124 |
| | | 2.0 | 6.02 | 240 | 92 | 81 |
| 30% sol-gel alumina 90% Syenite | G (T grade) | 0.5 | 67.07 | 511 | 50 | 94 |
| | | 1.0 | 14.83 | 264 | 78 | 141 |
| | | 2.0 | 3.79 | 151 | 92 | 96 |
| 50% sol-gel alumina 90% Syenite | J (T grade) | 0.6 | 67.69 | 516 | 50 | 100 |
| | | 1.0 | 19.66 | 350 | 87 | 112 |
| | | 2.0 | 7.55 | 301 | 100 | 96 |
| 50% sol-gel alumina 50% bubble alumina | K (T grade) | 0.5 | 67.59 | 515 | 63 | 106 |
| | | 1.0 | 44.99 | 802 | 117 | 153 |
| | | 2.0 | 12.81 | 510 | 116 | 92 |
| 50% sol-gel alumina 50% 57A TM alumina' | L (T grade) | 0.5 | 66.97 | 510 | 96 | 112 |
| | | 1.0 | 18.68 | 333 | 135 | 141 |
| | | 2.0 | 8.97 | 357 | 180 | 112 |
| 100% 57A TM alumina | M (grade ZZ) | 0.5 | 11.84 | 90 | 108 | 125 |
| | | 1.0 | 5.94 | 106 | 143 | 153 |
| | | 2.0 | 3.40 | 135 | 184 | 158 |
| 50% sol-gel alumina 50% 57A TM alumina | N (grade ZZ) | 0.5 | 44.82 | 341 | 83 | 125 |
| | | 1.0 | 14.96 | 267 | 104 | 141 |
| | | 2.0 | 8.06 | 321 | 172 | 131 |
| 100% sol-gel alumina | P (grade ZZ) | 0.5 | 80.36 | 612 | 108 | 125 |
| | | 1.0 | 40.32 | 719 | 139 | 159 |
| | | 2.0 | 14.85 | 592 | 168 | 158 |

The relative grinding results shown in Table 2 are calculated by dividing the actual value by the value of the standard R-grade 57A TM fused alumina wheel A and multiplying by 100. Thus, all relative values for the standard wheel are equal to 100.

The substitution of 30% sol-gel alumina, as in wheel B, for the standard fused alumina improved G-ratio by 200 to 250% in R-grade, and when the sol-gel alumina was increased to 50% and grade was increased to T, as in wheel L, G-ratio increased 330 to 530%. The abrasive portion of wheel P (hot pressed grade ZZ) was 100% sol-gel sintered alumina and G-ratio increased 600 to 700% over that of standard fused alumina wheel A.

The preferred invention wheel K, whose abrasive portion is composed of 50% sol-gel alumina and 50% bubble alumina, showed a G-ratio 500 to 800% greater than the standard fused alumina wheel A. Power requirements for wheel K were not excessive; in fact, at the heaviest final downfeed wheel K drew slightly less power than standard wheel A.

Wheels C, D, E, G, and J represent another embodiment of the invention in that the diluent for the sol-gel abrasive is a friable silicate particle, in this case, nepheline syenite. From the data in Table II, the relative G-ratio of these wheels was as much as 516% greater than that of the standard fused alumina wheel A. Wheel J, whose abrasive portion consisted of 50% sol-gel alumina and 50% nepheline syenite, showed a relative G-ratio 516% greater than the standard at the lowest infeed and 300% greater than the standard at the highest infeed without an increase in power.

EXAMPLE 2

A series of six test wheels of the same size as those in Example 1 were prepared from the batch compositions shown in Table 3.

TABLE 3

BATCH WEIGHTS IN POUNDS

| Wheel marking | A | 2 | 3 | 6 | 8 | 10 |
|---|---|---|---|---|---|---|
| Wheel grade | R | T | T | T | T | T |
| Density | 2.54 | 2.61 | 2.60 | 2.60 | 1.83 | 1.82 |
| 46 grit size seeded sol-gel alumina abrasive | 0 | 0 | 1.16 | 3.48 | 4.94 | 8.27 |
| 46 grit size semifriable fused alumina abrasive | 12.14 | 11.18 | 10.65 | 8.31 | 3.36 | 0 |
| Bubble alumina 0.5–10 mm dia. | 0 | 0 | 0 | 0 | 2.16 | 2.16 |
| Varcum 29717 TM powdered phenolic resin | 1.39 | 1.79 | 1.79 | 1.85 | 2.62 | 2.63 |
| Varcum 2930 TM liquid phenolic resin | 0.22 | 0 | 0 | 0 | 0 | 0 |
| Cryolite −200 mesh | 1.27 | 1.16 | 1.16 | 1.20 | 1.70 | 1.71 |
| Chloroflo 40 TM | 23 cc | 24 cc | 24 cc | 24 cc | 24 cc | 24 cc |
| Furfural | | 80 cc | 80 cc | 81 cc | 114 cc | 115 cc |
| Quicklime | | 0.26 | 0.26 | 0.26 | 0.38 | 0.38 |

Methods of mix, cold pressing and curing were the same as in Example 1. After finishing to size these test wheels were subjected to the same slot grinding test as in Example 1 with the exception that horsepower was measured by dynamometer. The results of the grinding these are shown in Table 4.

TABLE 4

SLOT GRINDING TEST RESULTS

| Abrasive/ Diluent | Wheel Marking | Feed (mils) | G Ratio (S/W) | Relative G Ratio | Relative Power |
|---|---|---|---|---|---|
| 100% 57A TM fused alumina | A (R grade) | 0.5 | 15.37 | 100 | 100 |
| | | 1.0 | 6.37 | 100 | 100 |
| | | 2.0 | 3.10 | 100 | 100 |
| 100% 57A TM fused alumina | 2 (T grade) | 0.5 | 18.02 | 117 | 192 |
| | | 1.0 | 9.32 | 146 | 125 |
| | | 2.0 | 5.00 | 161 | 137 |
| 90% 57A TM fused alumina 10% sol-gel alumina | 3 (T grade) | 0.5 | 18.02 | 117 | 192 |
| | | 1.0 | 9.32 | 146 | 125 |
| | | 2.0 | 5.00 | 161 | 137 |
| 70% 57A. TM fused alumina 30% sol-gel alumina | 6 (T grade) | 0.5 | 30.85 | 201 | 149 |
| | | 1.0 | 16.25 | 255 | 125 |
| | | 2.0 | 4.80 | 155 | 93 |
| 20% 57A TM fused alumina 30% sol-gel | 8 (T grade) | 0.5 | 50.13 | 326 | 113 |
| | | 1.0 | 21.70 | 341 | 91 |
| | | 2.0 | 6.43 | 207 | 84 |

TABLE 4-continued

SLOT GRINDING TEST RESULTS

| Abrasive/ Diluent | Wheel Marking | Feed (mils) | G Ratio (S/W) | Relative G Ratio | Relative Power |
|---|---|---|---|---|---|
| alumina | 50% bubble alumina | | | | |
| 50% sol-gel alumina | 10 | 0.5 | 81.01 | 527 | 72 |
| 50% bubble alumina | (T grade) | 1.0 | 38.46 | 604 | 80 |
| | | 2.0 | 16.75 | 540 | 87 |

The test results of Example 2 as shown in Table 4 again illustrate the marked increase in G-ratio of the preferred invention wheels. Both wheels 6 and 8 contain 30% sintered sol-gel alumina abrasive by volume of total abrasive; however, the remainder of the abrasive portion of wheel 6 is 70% fused alumina and 50% bubble alumina. Wheel 8, containing bubble alumina, considerably outperforms wheel 6 in both G-ratio and power even though both contain the same volume (30%) of sintered sol-gel alumina. Wheel 10, whose abrasive portion is 50% sintered sol-gel alumina and 50% bubble alumina, outperformed the standard fused alumina wheel by 527 to 604% in G-ratio and drew 13% to 27% less power.

EXAMPLE 3

In this series of test wheels, various blends of sintered sol-gel alumina with semifriable fused alumina and bubble alumina were evaluated. The compositions of the mix batches from which these wheels were pressed are given in Table 5.

TABLE 5

BATCH WEIGHTS IN POUNDS

| Wheel marking | 4 | 5 | 7 | 9 | 11 | 12 |
|---|---|---|---|---|---|---|
| Wheel grade | T | T | T | T | T | T |
| Density | 2.37 | 2.02 | 2.01 | 2.00 | 2.09 | 2.00 |
| 46 grit sol-gel alumina | 1.69 | 1.99 | 5.99 | 10.03 | 9.63 | 10.03 |
| 46 grit 57A ™ fused alumina | 12.13 | 8.14 | 4.86 | 0 | 0 | 0 |
| 0.5 mm-1 mm bubble alumina | 1.49 | 4.38 | 4.40 | 4.42 | 4.24 | 4.42 |
| Varcum 29717 ™ powdered phenolic resin | 2.70 | 2.90 | 3.19 | 3.20 | 3.06 | 3.20 |
| Cryolite −200 mesh | 1.75 | 1.88 | 2.06 | 2.07 | 0 | 2.07 |
| Iron pyrites | 0 | 0 | 0 | 0 | 2.39 | 0 |
| Potassium sulfate | 0 | 0 | 0 | 0 | 0.45 | 0 |
| Chloroflo 40 ™ | 32 cc | 32 cc | 32 cc | 32 cc | 32 cc | 32 cc |
| Furfural 139 cc | 118 cc | 126 cc | 139 cc | 139 cc | 154 cc | |
| Quicklime | 0.39 | 0.42 | 0.46 | 0.46 | 0.44 | 0.46 |

Methods of mixing, cold pressing and curing were the same as in Example 1. After finishing to size these test wheels were subjected to the same slot grinding test as in Example 1 with the exception that horsepower was measured by dynamometer. The results of the grinding test are shown in Table 6.

TABLE 6

SLOT GRINDING TEST RESULTS

| Abrasive/ Diluent | Wheel Marking | Feed (mils) | G Ratio (S/W) | Relative G Ratio | Relative Power |
|---|---|---|---|---|---|
| 70% 57A ™ | 4 | 0.5 | 22.79 | 148 | 105 |

TABLE 6-continued

SLOT GRINDING TEST RESULTS

| Abrasive/ Diluent | Wheel Marking | Feed (mils) | G Ratio (S/W) | Relative G Ratio | Relative Power |
|---|---|---|---|---|---|
| fused alumina | (T grade) | 1.0 | 11.49 | 180 | 93 |
| 10% sol-gel alumina | | 2.0 | 2.44 | 79 | 89 |
| 20% bubble alumina | | | | | |
| 40% 57A ™ | 5 | 0.5 | 26.40 | 172 | 92 |
| fused alumina | (T grade) | 1.0 | 10.70 | 168 | 91 |
| 10% sol-gel alumina | | 2.0 | 3.86 | 124 | 75 |
| 50% bubble alumina | | | | | |
| 20% 57A ™ | 7 | 0.5 | 65.58 | 427 | 73 |
| fused alumina | (T grade) | 1.0 | 22.67 | 356 | 79 |
| 30% sol-gel alumina | | 2.0 | 5.14 | 166 | 63 |
| 50% bubble alumina | | | | | |
| 50% sol-gel alumina | 9 | 0.5 | 107.47 | 699 | 57 |
| alumina | (T grade) | 1.0 | 48.93 | 768 | 77 |
| 50% bubble alumina (cryolite filler) | | 2.0 | 8.54 | 275 | 65 |
| 50% sol-gel alumina | 11 | 0.5 | 91.49 | 595 | 60 |
| alumina | (T grade) | 1.0 | 45.31 | 711 | 74 |
| 50% bubble alumina (iron pyrites + $K_2SO_4$ fillers) | | 2.0 | 9.92 | 320 | 69 |
| 50% sol-gel alumina | 12 | 0.5 | 67.01 | 436 | 59 |
| alumina | (T grade) | 1.0 | 45.49 | 714 | 69 |
| 50% bubble alumina (both silane treated) | | | | | |

The grinding test results from Example 3 again show the unexpectedly large increase in G-ratio obtained from the preferred embodiment of the invention, combinations from the preferred embodiment of the invention, combinations of sintered sol-gel alumina and alumina bubbles. Wheels 9, 11, and 12 containing 50% sintered sol-gel alumina and 50% alumina bubbles by volume of the abrasive portion gave G-ratios 275% to 768% greater than a standard wheel containing 100% fused alumina. The power expended in grinding was 25% to 40% less for the invention wheel indicating that the invention wheel is much more efficient and would be less likely to cause metallurgical damage to the workpiece.

The embodiments disclosed herein are illustrative of the unexpectedly high G-ratios obtainable when hollow oxide spheres or friable particles are incorporated into abrasive bodies whose abrasive portion is wholly or in part composed of sintered sol-gel alumina grits and such embodiments are not in any way limitative. The advantages of using friable particles can also be obtained in an abrasive article that is vitreous bonded containing sintered sol-gel alumina particles.

Obviously minor changes may be made in the form and construction of this invention without departing from its spirit. Thus, it is not desired to confine the invention to the exact form shown and described, but it is desired to include all such as properly come within the scope claimed.

The invention having been thus described, what is claimed as new and desired to secure by Letters Patent is:

We claim:

1. Abrasive article, comprising:
   (a) sintered sol-gel aluminous abrasive particles,
   (b) particles having greater friability than the sintered sol-gel alumina abrasive particles selected from the group consisting of hollow oxide spheres, friable silicate particles, and hollow or solid organic polymer spheres and
   (c) a resin bond in which the abrasives are mounted and held.

2. Abrasive articles as recited in claim 1, wherein said other particles are bubble alumina.

3. Abrasive particles as recited in claim 1, wherein additional abrasive particles are used, selected from the group consisting of fused or sintered alumina, silicon carbide, fused or sintered zirconia, fused or sintered alumina-zirconia, diamond, or CBN.

4. Abrasive article as recited in claim 1, wherein said other particles are selected from the group of aluminum oxide bubbles, zirconium oxide bubbles, glass bubbles, glass beads, vitrified clay bubbles, vitrified clay pellets.

5. Abrasive article as recited in claim 1, wherein the resin bond is selected from the class consisting of phenol-formaldehyde, phenol-furfural, analaine-formaldehyde, urea-formaldehyde, phenoxy, thereof.

6. Abrasive article as recited in claim 1, filler matters are selected from the group consisting of iron pyrites, potassium sulfate, cryolite, sodium chloride, potassium fluoborate, silicon carbide, alumina fluorspar, zinc sulfide, chopped glass fibers, copolymer of vinylidene chloride and vinyl chloride, polyvinyl chloride, polyvinylidene chloride, and mixtures thereof.

7. Abrasive article as recited in claim 1, wherein the sintered sol-gel alumina abrasive particles and said other particles are present in the amount of approximately 50% and 50%, respectively, by weight of the total amount of abrasive particles.

8. Abrasive article as recited in claim 1, wherein the sintered sol-gel alumina abrasive particles are made up of a multitude of crystallites having a size in the order of 0.4 microns or finer.

9. Abrasive article according to claim 1, in which the hollow oxide spheres or friable silicate pellets range in size from 10 to 200 mesh.

10. Abrasive article according to claim 1, in which the said other particles range in size from 10 to 200 mesh.

11. Abrasive article according to claim 1, in which the said other particles constitute from ten volume percent to sixty volume percent of said article.

12. Abrasive article according to claim 1, in which the hollow oxide spheres or friable silicate pellets constitute from ten volume percent to sixty volume percent of said article.

13. Abrasive article according to claim 1, wherein said sintered sol gel aluminous abrasive is a seeded sintered sol gel aluminous abrasive.

* * * * *

UNITED STATES PATENT AND TRADEMARK OFFICE
CERTIFICATE OF CORRECTION

PATENT NO. : 5,037,453

DATED : August 6, 1991

INVENTOR(S) : Kesh S. Narayanan, Muni S. Ramakrishnan

It is certified that error appears in the above-identified patent and that said Letters Patent is hereby corrected as shown below:

Column 9, line 22, delete "class" and substitute "group" in place thereof in claim 5.

Column 9, line 24, add "polyimide, epoxy, urethane, polyester, and combinations" before "thereof" in claim 5.

Column 9, lines 25 & 26, delete "filler matters are" and substitute "including a filler" in place thereof in claim 6.

UNITED STATES PATENT AND TRADEMARK OFFICE
CERTIFICATE OF CORRECTION

PATENT NO. : 5,037,453
DATED : August 6, 1991
INVENTOR(S) : Kesh S. Narayanan, Muni S. Ramakrishnan It is certified that error appears in the above-identified patent and that said Letters Patent is hereby corrected as shown below:

```
    Column 9, line 11, delete "other" from claim 2.
    Column 9, line 12, delete "particles" and substitute
"articles" in place thereof in claim 3.
    Column 9, line 18, delete "other" from claim 4.
    Column 10, line 5, delete "other" and column 10, line 7,
delete "abrasive" from claim 7.
    Column 10, line 16, delete "other" from claim 10.
    Column 10, line 20, delete "other" from claim 11.
    Column 10, line 27, delete "is a" and substitute
"particles are" in place thereof, and on Column 10, line 28, add
"particles" after "abrasive" in claim 13.
```

Signed and Sealed this

Seventeenth Day of August, 1999

Q. TODD DICKINSON

*Attest:*

*Attesting Officer*    Acting Commissioner of Patents and Trademarks

(12) EX PARTE REEXAMINATION CERTIFICATE (6367th)
United States Patent
Narayanan et al.

(10) Number: US 5,037,453 C1
(45) Certificate Issued: *Aug. 19, 2008

(54) ABRASIVE ARTICLE

(75) Inventors: Kesh S. Narayanan, Holden, MA (US); Muni S. Ramakrishnan, Northborough, MA (US)

(73) Assignee: Saint-Gobain Abrasives, Inc., Worcester, MA (US)

Reexamination Request:
No. 90/007,528, Apr. 29, 2005

Reexamination Certificate for:
Patent No.: 5,037,453
Issued: Aug. 6, 1991
Appl. No.: 07/406,487
Filed: Sep. 13, 1989

(*) Notice: This patent is subject to a terminal disclaimer.

Certificate of Correction issued Aug. 17, 1999.

(51) Int. Cl.
B24D 3/20 (2006.01)
B24D 3/34 (2006.01)
B24D 3/28 (2006.01)
C09K 3/14 (2006.01)

(52) U.S. Cl. ............................. 51/307; 51/298; 51/308; 51/309

(58) Field of Classification Search ....................... None
See application file for complete search history.

(56) References Cited

U.S. PATENT DOCUMENTS

| | | |
|---|---|---|
| 2,806,772 A | 9/1957 | Robie |
| 3,079,243 A | 2/1963 | Ueltz |
| 3,387,957 A | 6/1968 | Howard |
| 3,909,991 A | 10/1975 | Coes |
| 4,226,602 A | 10/1980 | Fukuda |
| 4,314,827 A | 2/1982 | Leitheiser et al. |
| 4,588,419 A | 5/1986 | Caul |
| 4,734,104 A | 3/1988 | Broberg |
| 4,770,671 A | 9/1988 | Monroe |
| 4,786,292 A | 11/1988 | Janz |
| 4,799,939 A | 1/1989 | Bloecher |
| 4,881,951 A | 11/1989 | Wood et al. |
| 4,898,597 A | 2/1990 | Hay |
| 4,997,461 A | 3/1991 | Markhoff-Matheny |
| 5,035,723 A | 7/1991 | Kalinowski et al. |
| 5,129,919 A | 7/1992 | Kalinowski |
| 5,164,348 A | 11/1992 | Wood |
| 5,312,789 A | 5/1994 | Wood |
| 5,453,104 A | 9/1995 | Schwabel |

FOREIGN PATENT DOCUMENTS

EP 0 280 463 A2 8/1988

OTHER PUBLICATIONS

Settlement Order of Dismissal, Case No. 06–40056–FDS (U.S. District Court, District of Massachusetts), dated Jan. 4, 2007.

Defendant's Motion for More Definite Statement and/or Stay, Saint–Gobain Abrasives, Inc. v. Radiac Abrasives, Inc., Case No. 06–40056 FDS (U.S. District Court, District of Massachusetts), filed May 11, 2006.
Memorandum in Support of Defendant's Motion for More Definite Statement and/or Stay, Exhibits A, B & C, Saint–Gobain Abrasives, Inc. v. Radiac Abrasives, Inc., Case No. 06–40056 FDS (U.S. District Court, District of Massachusetts), filed May 12, 2006.
First Amended Complain and Jury Demand, Saint–Gobain Abrasives, Inc. v. Radiac Abrasives, Inc., Case No. 06–40056 FDS (U.S. District Court, District of Massachusetts), filed May 25, 2006.
Defendant's Reply to Plaintiff's Opposition to Stay, Saint–Gobain Abrasives, Inc. v. Radiac Abrasives, Inc., Case No. 06–40056 FDS (U.S. District Court, District of Massachusetts), filed Jun. 6, 2006.
Answer, Counterclaim and Jury Demand, Saint–Gobain Abrasives, Inc. v. Radiac Abrasives, Inc., Case No. 06–40056 FDS (U.S. District Court, District of Massachusetts), filed Jun. 9, 2006.
Plaintiff's Reply to Defendant's Counterclaim, Saint–Gobain Abrasives, Inc. v. Radiac Abrasives, Inc. ,Case No. 06–40056 FDS (U.S. District Court, District of Massachusetts), filed Jun. 21, 2006.
Plaintiff's Response to Supplemental Memorandum in Support of Defendant's Motion for More Definite Statement and/or Stay, Saint–Gobain Abrasives, Inc.v. Radiac Abrasives, Inc., Case No. 06–40056 FDS (U.S. District Court, District of Massachusetts), filed Aug. 29, 2006.
Coes, L., Abrasives, New York, 1971, as provided by Noritake Co., Ltd., (pp. 17–19).
Extended partial translation of JP–A–62–251077 as provided by Noritake Co., Ltd.,, Sep. 9, 1997, (11 pages).
Translation of JP–A–54–13090 as provided by Noritake Co., Ltd.,, Feb. 7, 1996, (10 pages).
Dodd, A. E., Concise Encyclopaedic Dictionary of Ceramics, as provided by Noritake Co., Ltd., 1967, (pp. v, 208–209).
Partial translation of JP–A–55–137887 as provided by Noritake Co., Ltd., Nov. 2, 1995, (3 pages).
Partial translation of JP–A–59–107859 as provided by Noritake Co., Ltd., Nov. 2, 1995, (6 pages).
Translation of JP–B–37–746 as provided by Noritake Co., Ltd., Feb. 7, 1996, (6 pages).
Partial translation of JP–A–57–21270 as provided by Noritake Co., Ltd., (5 pages).
Kirk,–Othmer, Encyclopedia of Chemical Technology, Second Edition, vol. 18, as provided by Noritake Co., Ltd., Oct. 11, 1996 (pp. 318–319).
Notice of Opposition of EP–B–418738 and Statement in Support by Minnesota Mining and Manufacturing Co., Oct. 25, 1995, (27 pages).
Notice of Opposition of EP–B–418738 and Statement in Support by Noritake Co., Ltd. Oct. 25, 1995, (16 pages).

(Continued)

Primary Examiner—Stephen Stein

(57) ABSTRACT

Abrasive article using sintered sol-gel abrasive particles mixed with other particles having greater friability, and carried in a bond.

OTHER PUBLICATIONS

Response by Norton Company to Notices of Opposition of EP–B–418738, Oct. 11, 1996, (24 pages).
Request for Correction of Error in Response to Notices of Opposition of EP–B–418738 by Norton Company. Jan. 22, 1997, (4 pages).
Provisional Opinion f the Opposition Division in the Oppositions of EP–B–418738, Feb. 6, 1997, (4 pages).
Amended Statement of Opposition to EP–B–418738 by Noritake Co., Ltd., Aug. 11, 1997 (13 pages).
Reply to Response of Norton Company by Minnesota Mining and Manufacturing Co., Sep. 9, 1997, (12 pages).
Response by Norton Co., to the Provisional Opinion of the Opposition Division, Sep. 9, 1997 (27 pages).
Supplementary Statement of Opposition to EP–B–418738 by Noritake Co., Ltd., Sep. 9, 1997, (35 pages).
Decision Revoking the European Patent, Dec. 12, 1997, (24 pages).
Minutes of the Oral Proceeding Before the Opposition Division, Dec. 12, 1997, (8 pages).
Notice of Appeal from the Decision Revoking the European Patent, Feb. 12, 1998, (1 page).
Grounds for Appeal in Response to the Decision of the Opposition Division by Norton Co., Apr, 22, 1998, (20 pages).
Observations in Response to the Grounds for Appeal by Noritake Co., Ltd., Nov. 17, 1998, (16 pages).
Reply to the Grounds for Appeal by Minnesota Mining and Manufacturing Co., Nov. 18, 1998, (21 pages).
Provisional Opinion of the Board of Appeal of the European Patent Office, Apr. 4, 2001, (5 pages).
Response by Norton Co. to the Provisional Opinion of the Board of Appeal of the European Patent Office, Nov. 9, 2001, (34 pages).
Declaration of Dr. Ernie Duwell in Support of the Opposition to EP–B–418738 by Minnesota Mining and Manufacturing Co., Nov. 15, 2001 (3 pages).
Decision of the Technical Board of Appeal Regarding the Opposition of EP–B–418738, Dec. 11, 2001, (23 pages).
Minutes of the Oral Proceedings before the Technical Board of Appeal, Dec. 11, 2001, (4 pages).
Notice of Reasons for Cancellation of JP–2523971, Jul. 28, 1997, (15 pages).
Proposed Corrected Claims for JP–2523971, Sep. 30, 1998, (2 pages).
Decision Regarding Filing of Patent Opposition of JP–2523971, Feb. 19, 1999, (20 pages).
Plaintiff's Preparatory Document (1), *Norton Co., v. Commissioner of the Patent Office*, The Tokyo High Court, Civil Department 18, Oct. 26, 1999, (29 pages).
Defendant's Rebuttal to Plaintiff's Preparatory Document (1), *Norton Co., v. Commissioner of the Patent Office*, The Tokyo High Court, Civil Department 18, Dec. 17, 1999, (39 pages).
Plaintiff's Preparatory Documet (3), *Norton Co., v. Commissioner of the Patent Office*, The Tokyo High Court, Civil Department 18, Mar. 2, 2000, (44 pages).
Plaintiff's Preparatory Documet (4), *Norton Co., v. Commissioner of the Patent Office*, The Tokyo High Court, Civil Department 18, May 31, 2000, (23 pages).
Defendant's Preparatory Documet (2), *Norton Co., v. Commissioner of the Patent Office*, The Tokyo High Court, Civil Department 18, Jun. 29, 2000, (30 pages).
Intervenor's Preparatory Documet (1st), *Norton Co., v. Commissioner of the Patent Office*, The Tokyo High Court, Civil Department 18, Jul. 11, 2000, (38 pages).
Intervenor's Preparatory Documet (2), *Norton Co., v. Commissioner of the Patent Office*, The Tokyo High Court, Civil Department 18, Jan. 23, 2001, (28 pages).
Decision of the Tokyo High Court, Civil Department 18, *Norton Co., v. Commissioner of the Patent Office*, The Tokyo High Court, Civil Department 18, May 30, 2002, (17 pages).
Complaint and Jury Demand, *Saint–Gobain Abrasives, Inc. v. Radiac Abrasives, Inc.*, Case No. 4:06–cv–40056–FDS, (U.S. District Court, District of Massachusetts), filed Mar. 22, 2006 (6 pages).
Sales Letter: From Morris I. Pollack, Senior Counsel, Western Atlas, Apr. 9, 1997, addressed to Mary Porter, counsel for Norton.
Book Excerpt: *CRC Handbook of Chemistry abd Physics*, $79^{th}$ ed, New York: CRC Press, 1998, p. 4–38, (No. 40).
Book Excerpt: Keegan, J.F. "Phenolic Resins," Chap. 17, Table 17.1 in *Handbook of Plastic Materials and Technology*, Rubin, Irvin I., ed. New York; Wiley, 1990.
Definition: *Hawley's Condensed Chemical Dictionary*, $13^{th}$ ed., New York: Wiley, 1997, p. 313.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–13 is confirmed.

* * * * *

(12) EX PARTE REEXAMINATION CERTIFICATE (6669th)
United States Patent
Narayanan et al.

(10) Number: US 5,037,453 C2
(45) Certificate Issued: Feb. 17, 2009

(54) ABRASIVE ARTICLE

(75) Inventors: Kesh S. Narayanan, Holden, MA (US); Muni S. Ramakrishnan, Northborough, MA (US)

(73) Assignee: Saint-Gobain Abrasives, Inc., Worcester, MA (US)

Reexamination Request:
No. 90/008,653, May 18, 2007

Reexamination Certificate for:
Patent No.: 5,037,453
Issued: Aug. 6, 1991
Appl. No.: 07/406,487
Filed: Sep. 13, 1989

Reexamination Certificate C1 5,037,453 issued Aug. 19, 2008

Certificate of Correction issued Aug. 17, 1999.

(51) Int. Cl.
*B24D 3/02* (2006.01)
*B24D 3/034* (2006.01)
*B24D 3/028* (2006.01)
*C09K 3/014* (2006.01)

(52) U.S. Cl. ............................... 51/307; 51/298; 51/308; 51/309

(58) Field of Classification Search .................. None
See application file for complete search history.

(56) References Cited

U.S. PATENT DOCUMENTS

| | | |
|---|---|---|
| 2,806,772 A | 9/1957 | Robie |
| 3,079,243 A | 2/1963 | Ueltz |
| 3,387,957 A | 6/1968 | Howard |
| 3,909,991 A | 10/1975 | Coes |
| 4,226,602 A | 10/1980 | Fukuda |
| 4,314,827 A | 2/1982 | Leitheiser et al. |
| 4,588,419 A | 5/1986 | Caul |
| 4,734,104 A | 3/1988 | Broberg |
| 4,744,802 A | 5/1988 | Schwabel |
| 4,770,671 A | 9/1988 | Monroe |
| 4,786,292 A | 11/1988 | Janz |
| 4,799,939 A | 1/1989 | Bloecher |
| 4,881,951 A | 11/1989 | Wood et al. |
| 4,898,597 A | 2/1990 | Hay |
| 4,997,461 A | 3/1991 | Markhoff-Matheny |
| 5,009,676 A | 4/1991 | Rue et al. |
| 5,035,723 A | 7/1991 | Kalinowski et al. |
| 5,129,919 A | 7/1992 | Kalinowski |
| 5,164,348 A | 11/1992 | Wood |
| 5,312,789 A | 5/1994 | Wood |
| 5,453,104 A | 9/1995 | Schwabel |

FOREIGN PATENT DOCUMENTS

EP 0 280 463 A2 8/1988

OTHER PUBLICATIONS

Coes, L., Abrasives, New York, 1971, as provided by Noritake Co., Ltd. (pp. 17–19).
Extended partial translation of JP–A–62–251077 as provided by Noritake Co., Ltd., Sep. 9, 1997 (11 pages).
Translation of JP–A–54–13090 as provided by Noritake Co., Ltd., Feb. 7, 1996 (10 pages).
Dodd, A. E., Concise Encyclopaedic Dictionary of Ceramics, as provided by Noritake Co., Ltd., 1967 (pp. v, 208–209).
Partial translation of JP–A–55–137887 as provided by Noritake Co., Ltd., Nov. 2, 1995 (3 pages).
Partial translation of JP–A–59–107859 as provided by Noritake Co., Ltd., Nov. 2, 1995 (6 pages).
Translation of JP–B–37–746 as provided by Noritake Co., Ltd., Feb. 7, 1996 (6 pages).
Partial translation of JP–A–57–21270 as provided by Noritake Co., Ltd. (5 pages).
Kirk,–Othmer, Encyclopedia of Chemical Technology, Second Edition, vol. 18, as provided by Noritake Co., Ltd., Oct. 11, 1996 (pp. 318–319).
Book Excerpt: *CRC Handbook of Chemistry and Physics*, 79$^{th}$ ed, New York: CRC Press, 1998, p. 4–38, (No. 40).
Book Excerpt: Keegan, J.F. "Phenolic Resins," Chap. 17, Table 17.1 in *Handbook of Plastic Materials and Technology*, Rubin, Irvin I., ed. New York: Wiley, 1990.
Definition: *Hawley's Condensed Chemical Dictionary*, 13$^{th}$ ed., New York: Wiley, 1997, p. 313.

*Primary Examiner*—Jerry D. Johnson

(57) ABSTRACT

Abrasive article using sintered sol-gel abrasive particles mixed with other particles having greater friability, and carried in a bond.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–13 is confirmed.

* * * * *